US011256724B2

(12) United States Patent
Lunde

(10) Patent No.: US 11,256,724 B2
(45) **Date of Patent: *Feb. 22, 2022**

(54) SYSTEMS AND METHODS FOR PROBABILISTIC DATA CLASSIFICATION

(71) Applicant: Commvault Systems, Inc., Tinton Falls, NJ (US)

(72) Inventor: Norman R. Lunde, Middletown, NJ (US)

(73) Assignee: Commvault Systems, Inc., Tinton Falls, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/944,555

(22) Filed: Jul. 31, 2020

(65) Prior Publication Data

US 2020/0364244 A1 Nov. 19, 2020

Related U.S. Application Data

(63) Continuation of application No. 16/818,781, filed on Mar. 13, 2020, now Pat. No. 10,783,168, which is a (Continued)

(51) Int. Cl.
*G06F 16/28* (2019.01)
*G06F 16/13* (2019.01)
(Continued)

(52) U.S. Cl.
CPC ........ *G06F 16/285* (2019.01); *G06F 11/1461* (2013.01); *G06F 16/13* (2019.01); *G06F 16/90* (2019.01); *G06F 2201/84* (2013.01)

(58) Field of Classification Search
CPC ......... G06F 16/285; G06F 16/90; G06F 16/13
(Continued)

(56) References Cited

U.S. PATENT DOCUMENTS 4,686,620 A 8/1987 Ng
4,995,035 A 2/1991 Cole et al.
(Continued)

FOREIGN PATENT DOCUMENTS

EP 0259912 3/1988
EP 0405926 1/1991
(Continued)

OTHER PUBLICATIONS

Arneson, "Development of Omniserver; Mass Storage Systems," Control Data Corporation, 1990, pp. 88-93.
(Continued)

*Primary Examiner* — Kimberly L Wilson
(74) *Attorney, Agent, or Firm* — Knobbe Martens Olson & Bear LLP

(57) ABSTRACT

A system for performing data classification operations. In one embodiment, the system comprises a file system configured to store a plurality of computer files and a scanning agent configured to traverse the file system and compile data regarding the attributes and content of the plurality of computer files. The system also comprises an index configured to store the data regarding attributes and content of the plurality of computer files and a file classifier configured to analyze the data regarding the attributes and content of the plurality of computer files and to classify the plurality of computer files into one or more categories based on the data regarding the attributes and content of the plurality of computer files. Results of the file classification operations can be used to set appropriate security permissions on files which include sensitive information or to control the way that a file is backed up or the schedule according to which it is archived.

24 Claims, 3 Drawing Sheets

Related U.S. Application Data continuation of application No. 15/654,042, filed on Jul. 19, 2017, now Pat. No. 10,628,459, which is a continuation of application No. 14/968,719, filed on Dec. 14, 2015, now Pat. No. 9,740,764, which is a continuation of application No. 13/615,084, filed on Sep. 13, 2012, now abandoned, which is a continuation of application No. 12/022,676, filed on Jan. 30, 2008, now Pat. No. 8,296,301.

(51) Int. Cl.
*G06F 16/90* (2019.01)
*G06F 11/14* (2006.01)

(58) Field of Classification Search
USPC .......................................................... 707/654
See application file for complete search history.

(56) References Cited

U.S. PATENT DOCUMENTS

| | | | |
|---|---|---|---|
| 5,005,122 | A | 4/1991 | Griffin et al. |
| 5,093,912 | A | 3/1992 | Dong et al. |
| 5,133,065 | A | 7/1992 | Cheffetz et al. |
| 5,193,154 | A | 3/1993 | Kitajima et al. |
| 5,212,772 | A | 5/1993 | Masters |
| 5,226,157 | A | 7/1993 | Nakano et al. |
| 5,239,647 | A | 8/1993 | Anglin et al. |
| 5,241,668 | A | 8/1993 | Eastridge et al. |
| 5,241,670 | A | 8/1993 | Eastridge et al. |
| 5,276,860 | A | 1/1994 | Fortier et al. |
| 5,276,867 | A | 1/1994 | Kenley et al. |
| 5,287,500 | A | 2/1994 | Stoppani, Jr. |
| 5,321,816 | A | 6/1994 | Rogan et al. |
| 5,333,315 | A | 7/1994 | Saether et al. |
| 5,347,653 | A | 9/1994 | Flynn et al. |
| 5,410,700 | A | 4/1995 | Fecteau et al. |
| 5,448,724 | A | 9/1995 | Hayashi et al. |
| 5,491,810 | A | 2/1996 | Allen |
| 5,495,607 | A | 2/1996 | Pisello et al. |
| 5,504,873 | A | 4/1996 | Martin et al. |
| 5,519,865 | A | 5/1996 | Kondo et al. |
| 5,544,345 | A | 8/1996 | Carpenter et al. |
| 5,544,347 | A | 8/1996 | Yanai et al. |
| 5,559,957 | A | 9/1996 | Balk |
| 5,619,644 | A | 4/1997 | Crockett et al. |
| 5,638,509 | A | 6/1997 | Dunphy et al. |
| 5,673,381 | A | 9/1997 | Huai et al. |
| 5,699,361 | A | 12/1997 | Ding et al. |
| 5,737,747 | A | 4/1998 | Vishlitsky et al. |
| 5,751,997 | A | 5/1998 | Kullick et al. |
| 5,758,359 | A | 5/1998 | Saxon |
| 5,761,677 | A | 6/1998 | Senator et al. |
| 5,764,972 | A | 6/1998 | Crouse et al. |
| 5,778,395 | A | 7/1998 | Whiting et al. |
| 5,812,398 | A | 9/1998 | Nielsen |
| 5,813,009 | A | 9/1998 | Johnson et al. |
| 5,813,017 | A | 9/1998 | Morris |
| 5,819,292 | A | 10/1998 | Hitz et al. |
| 5,829,046 | A | 10/1998 | Tzelnic et al. |
| 5,832,510 | A | 11/1998 | Ito et al. |
| 5,875,478 | A | 2/1999 | Blumenau |
| 5,887,134 | A | 3/1999 | Ebrahim |
| 5,892,917 | A | 4/1999 | Myerson |
| 5,901,327 | A | 5/1999 | Ofek |
| 5,907,621 | A | 5/1999 | Bachman et al. |
| 5,924,102 | A | 7/1999 | Perks |
| 5,950,205 | A | 9/1999 | Aviani, Jr. |
| 5,953,721 | A | 9/1999 | Doi et al. |
| 5,974,563 | A | 10/1999 | Beeler, Jr. |
| 6,021,415 | A | 2/2000 | Cannon et al. |
| 6,026,414 | A | 2/2000 | Anglin |
| 6,052,735 | A | 4/2000 | Ulrich et al. |
| 6,061,692 | A | 5/2000 | Thomas et al. |
| 6,076,148 | A | 6/2000 | Kedem et al. |
| 6,094,416 | A | 7/2000 | Ying |
| 6,131,095 | A | 10/2000 | Low et al. |
| 6,131,190 | A | 10/2000 | Sidwell |
| 6,148,412 | A | 11/2000 | Cannon et al. |
| 6,154,787 | A | 11/2000 | Urevig et al. |
| 6,154,852 | A | 11/2000 | Amundson et al. |
| 6,161,111 | A | 12/2000 | Mutalik et al. |
| 6,167,402 | A | 12/2000 | Yeager |
| 6,175,829 | B1 | 1/2001 | Li et al. |
| 6,212,512 | B1 | 4/2001 | Barney et al. |
| 6,240,416 | B1 | 5/2001 | Immon et al. |
| 6,260,069 | B1 | 7/2001 | Anglin |
| 6,269,431 | B1 | 7/2001 | Dunham |
| 6,275,953 | B1 | 8/2001 | Vahalia et al. |
| 6,301,592 | B1 | 10/2001 | Aoyama et al. |
| 6,324,581 | B1 | 11/2001 | Xu et al. |
| 6,328,766 | B1 | 12/2001 | Long |
| 6,330,570 | B1 | 12/2001 | Crighton |
| 6,330,642 | B1 | 12/2001 | Carteau |
| 6,343,324 | B1 | 1/2002 | Hubis et al. |
| 6,350,199 | B1 | 2/2002 | Williams et al. |
| RE37,601 | E | 3/2002 | Eastridge et al. |
| 6,356,801 | B1 | 3/2002 | Goodman et al. |
| 6,374,336 | B1 | 4/2002 | Peters et al. |
| 6,389,432 | B1 | 5/2002 | Pothapragada et al. |
| 6,418,478 | B1 | 7/2002 | Ignatius et al. |
| 6,421,683 | B1 | 7/2002 | Lamburt |
| 6,421,711 | B1 | 7/2002 | Blumenau et al. |
| 6,421,779 | B1 | 7/2002 | Kuroda et al. |
| 6,430,575 | B1 | 8/2002 | Dourish et al. |
| 6,438,586 | B1 | 8/2002 | Hass et al. |
| 6,487,644 | B1 | 11/2002 | Huebsch et al. |
| 6,519,679 | B2 | 2/2003 | Devireddy et al. |
| 6,538,669 | B1 | 3/2003 | Lagueux, Jr. et al. |
| 6,542,909 | B1 | 4/2003 | Tamer et al. |
| 6,542,972 | B2 | 4/2003 | Ignatius et al. |
| 6,564,228 | B1 | 5/2003 | O'Connor |
| 6,581,143 | B2 | 6/2003 | Gagne et al. |
| 6,647,396 | B2 | 11/2003 | Parnell et al. |
| 6,658,436 | B2 | 12/2003 | Oshinsky et al. |
| 6,658,526 | B2 | 12/2003 | Nguyen et al. |
| 6,732,124 | B1 | 5/2004 | Koseki et al. |
| 6,763,351 | B1 | 7/2004 | Subramaniam et al. |
| 6,775,790 | B2 | 8/2004 | Reuter et al. |
| 6,871,163 | B2 | 3/2005 | Hiller et al. |
| 6,886,020 | B1 | 4/2005 | Zahavi et al. |
| 6,947,935 | B1 | 9/2005 | Horvitz et al. |
| 6,976,039 | B2 | 12/2005 | Chefalas et al. |
| 6,983,322 | B1 | 1/2006 | Tripp et al. |
| 6,996,616 | B1 | 2/2006 | Leighton et al. |
| 7,003,519 | B1 | 2/2006 | Biettron et al. |
| 7,028,079 | B2 | 4/2006 | Mastrianni et al. |
| 7,035,880 | B1 | 4/2006 | Crescenti et al. |
| 7,103,740 | B1 | 9/2006 | Colgrove et al. |
| 7,130,970 | B2 | 10/2006 | Devassy et al. |
| 7,167,895 | B1 | 1/2007 | Connelly |
| 7,181,444 | B2 | 2/2007 | Porter et al. |
| 7,216,043 | B2 | 5/2007 | Ransom et al. |
| 7,240,100 | B1 | 7/2007 | Wein et al. |
| 7,246,207 | B2 | 7/2007 | Kottomtharayil et al. |
| 7,246,211 | B1 | 7/2007 | Beloussov et al. |
| 7,269,604 | B2 | 9/2007 | Moore et al. |
| 7,272,606 | B2 | 9/2007 | Borthakur et al. |
| 7,330,997 | B1 | 2/2008 | Odom |
| 7,346,623 | B2 | 3/2008 | Prahlad et al. |
| 7,346,676 | B1 | 3/2008 | Swildens et al. |
| 7,359,917 | B2 | 4/2008 | Winter et al. |
| 7,454,569 | B2 | 11/2008 | Kavuri et al. |
| 7,461,063 | B1 * | 12/2008 | Rios ........................ G06F 17/18 |
| 7,500,150 | B2 | 3/2009 | Sharma et al. |
| 7,529,748 | B2 | 5/2009 | Wen et al. |
| 7,533,103 | B2 | 5/2009 | Brendle et al. |
| 7,583,861 | B2 | 9/2009 | Hanna et al. |
| 7,590,997 | B2 | 9/2009 | Perez |
| 7,613,752 | B2 | 11/2009 | Prahlad et al. |
| 7,627,598 | B1 | 12/2009 | Burke |
| 7,627,617 | B2 | 12/2009 | Kavuri et al. |
| 7,657,550 | B2 | 2/2010 | Prahlad et al. |
| 7,660,807 | B2 | 2/2010 | Prahlad et al. |

(56) References Cited

U.S. PATENT DOCUMENTS

| | | | |
|---|---|---|---|
| 7,725,671 | B2 | 5/2010 | Prahlad et al. |
| 7,747,579 | B2 | 6/2010 | Prahlad et al. |
| 7,792,850 | B1 | 9/2010 | Raffill et al. |
| 7,849,059 | B2 | 12/2010 | Prahlad et al. |
| 8,271,548 | B2 | 9/2012 | Prahlad et al. |
| 8,296,301 | B2 | 10/2012 | Lunde et al. |
| 9,740,764 | B2 | 8/2017 | Lunde |
| 10,628,459 | B2 | 4/2020 | Lunde |
| 10,783,168 | B2 | 9/2020 | Lunde |
| 2002/0004883 | A1 | 1/2002 | Nguyen et al. |
| 2002/0049738 | A1 | 4/2002 | Epstein |
| 2002/0069324 | A1 | 6/2002 | Gerasimov et al. |
| 2002/0083055 | A1 | 6/2002 | Pachet et al. |
| 2002/0087550 | A1 | 7/2002 | Carlyle et al. |
| 2002/0133476 | A1 | 9/2002 | Reinhardt |
| 2002/0174107 | A1 | 11/2002 | Poulin |
| 2003/0018607 | A1 | 1/2003 | Lennon et al. |
| 2003/0115219 | A1 | 6/2003 | Chadwick |
| 2003/0130993 | A1 | 7/2003 | Mendelevitch et al. |
| 2003/0163553 | A1 | 8/2003 | Kitamura et al. |
| 2003/0167267 | A1 | 9/2003 | Kawatani |
| 2003/0182583 | A1 | 9/2003 | Turco |
| 2004/0010493 | A1 | 1/2004 | Kojima et al. |
| 2004/0015468 | A1 | 1/2004 | Beier et al. |
| 2004/0015514 | A1 | 1/2004 | Melton et al. |
| 2004/0139059 | A1 | 7/2004 | Conroy et al. |
| 2004/0143508 | A1 | 7/2004 | Bohn et al. |
| 2004/0215878 | A1 | 10/2004 | Takata et al. |
| 2004/0254919 | A1 | 12/2004 | Giuseppini |
| 2004/0255161 | A1 | 12/2004 | Cavanaugh |
| 2004/0260678 | A1 | 12/2004 | Verbowski et al. |
| 2005/0037367 | A9 | 2/2005 | Fiekowsky et al. |
| 2005/0050075 | A1 | 3/2005 | Okamoto et al. |
| 2005/0114406 | A1 | 5/2005 | Borthakur et al. |
| 2005/0154695 | A1 | 7/2005 | Gonzalez et al. |
| 2005/0182773 | A1 | 8/2005 | Feinsmith |
| 2005/0182797 | A1 | 8/2005 | Adkins et al. |
| 2005/0188248 | A1 | 8/2005 | O'Brien et al. |
| 2005/0193128 | A1 | 9/2005 | Dawson et al. |
| 2005/0203964 | A1 | 9/2005 | Matsunami et al. |
| 2005/0216453 | A1 | 9/2005 | Sasaki et al. |
| 2005/0228794 | A1 | 10/2005 | Navas et al. |
| 2005/0257083 | A1 | 11/2005 | Cousins |
| 2005/0289193 | A1 | 12/2005 | Arrouye et al. |
| 2006/0004820 | A1 | 1/2006 | Claudatos et al. |
| 2006/0010227 | A1 | 1/2006 | Atluri |
| 2006/0031225 | A1 | 2/2006 | Palmeri et al. |
| 2006/0031263 | A1 | 2/2006 | Arrouye et al. |
| 2006/0031287 | A1 | 2/2006 | Ulrich et al. |
| 2006/0101285 | A1 | 5/2006 | Chen et al. |
| 2006/0106814 | A1 | 5/2006 | Blumenau et al. |
| 2006/0112146 | A1 | 5/2006 | Song et al. |
| 2006/0195449 | A1 | 8/2006 | Hunter et al. |
| 2006/0218365 | A1 | 9/2006 | Osaki et al. |
| 2006/0224846 | A1 | 10/2006 | Amarendran et al. |
| 2006/0253495 | A1 | 11/2006 | Png |
| 2006/0259468 | A1 | 11/2006 | Brooks et al. |
| 2006/0259724 | A1 | 11/2006 | Saika |
| 2006/0294094 | A1 | 12/2006 | King et al. |
| 2007/0027861 | A1 | 2/2007 | Huentelman et al. |
| 2007/0033191 | A1 | 2/2007 | Hornkvist et al. |
| 2007/0112809 | A1 | 5/2007 | Arrouye et al. |
| 2007/0179995 | A1 | 8/2007 | Prahlad et al. |
| 2007/0185914 | A1 | 8/2007 | Prahlad et al. |
| 2007/0185915 | A1 | 8/2007 | Prahlad et al. |
| 2007/0185916 | A1 | 8/2007 | Prahlad et al. |
| 2007/0185917 | A1 | 8/2007 | Prahlad et al. |
| 2007/0185921 | A1 | 8/2007 | Prahlad et al. |
| 2007/0185925 | A1 | 8/2007 | Prahlad et al. |
| 2007/0185926 | A1 | 8/2007 | Prahlad et al. |
| 2007/0192360 | A1 | 8/2007 | Prahlad et al. |
| 2007/0192385 | A1 | 8/2007 | Prahlad et al. |
| 2007/0198570 | A1 | 8/2007 | Prahlad et al. |
| 2007/0198593 | A1 | 8/2007 | Prahlad et al. |
| 2007/0198601 | A1 | 8/2007 | Prahlad et al. |
| 2007/0198608 | A1 | 8/2007 | Prahlad et al. |
| 2007/0198611 | A1 | 8/2007 | Prahlad et al. |
| 2007/0198613 | A1 | 8/2007 | Prahlad et al. |
| 2007/0203937 | A1 | 8/2007 | Prahlad et al. |
| 2007/0203938 | A1 | 8/2007 | Prahlad et al. |
| 2007/0282824 | A1* | 12/2007 | Ellingsworth ........ G06F 16/353 |
| 2007/0288536 | A1 | 12/2007 | Sen et al. |
| 2008/0021921 | A1 | 1/2008 | Horn |
| 2008/0059515 | A1 | 3/2008 | Fulton |
| 2008/0086433 | A1 | 4/2008 | Schmidter et al. |
| 2008/0091655 | A1 | 4/2008 | Gokhale et al. |
| 2008/0228771 | A1 | 9/2008 | Prahlad et al. |
| 2008/0243796 | A1 | 10/2008 | Prahlad et al. |
| 2008/0249996 | A1 | 10/2008 | Prahlad et al. |
| 2008/0249999 | A1 | 10/2008 | Renders et al. |
| 2008/0263029 | A1 | 10/2008 | Guha et al. |
| 2008/0294605 | A1 | 11/2008 | Prahlad et al. |
| 2008/0301757 | A1 | 12/2008 | Demarest et al. |
| 2009/0177728 | A1 | 7/2009 | Pottenger |
| 2009/0192979 | A1 | 7/2009 | Lunde et al. |
| 2009/0240737 | A1* | 9/2009 | Hardisty ................ G06F 16/10 |
| 2009/0287665 | A1 | 11/2009 | Prahlad et al. |
| 2010/0057870 | A1 | 3/2010 | Ahn et al. |
| 2010/0131467 | A1 | 5/2010 | Prahlad et al. |
| 2013/0066874 | A1 | 3/2013 | Lunde |

FOREIGN PATENT DOCUMENTS

| | | |
|---|---|---|
| EP | 0467546 | 1/1992 |
| EP | 0774715 | 5/1997 |
| EP | 0809184 | 11/1997 |
| EP | 0899662 | 3/1999 |
| EP | 0981090 | 2/2000 |
| EP | 1174795 | 1/2002 |
| WO | WO 1995/013580 | 5/1995 |
| WO | WO 1999/012098 | 3/1999 |
| WO | WO 1999/014692 | 3/1999 |
| WO | WO 2005/055093 | 6/2005 |
| WO | WO 2007/062254 | 5/2007 |
| WO | WO 2007/062429 | 5/2007 |
| WO | WO 2008/049023 A3 | 4/2008 |

OTHER PUBLICATIONS

Arneson, "Mass Storage Archiving in Network Environments" IEEE, 1998, pp. 45-50.B26.

Cabrera, et al. "ADSM: A Multi-Platform, Scalable, Back-up and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

Cooperstein et al., "Keeping an Eye on Your NTFS Drives: The Windows 2000 Change Journal Explained," Sep. 1999, retrieved from http://www.microsoft.com/msj/0999/journal/journal.aspx on Nov. 10, 2005, 17 pages.

Eitel, "Backup and Storage Management in Distributed Heterogeneous Environments," IEEE, 1994, pp. 124-126.

EMC Corporation, "Today's Choices for Business Continuity," 2004, 12 pages.

Gait, "The Optical File Cabinet: A Random-Access File system for Write-Once Optical Disks," IEEE Computer, vol. 21, No. 6, pp. 11-22 (1988).

http://en.wikipedia.org/wiki/Machine_learning, Jun. 1, 2010.

http://en.wikipedia.org/wiki/Naive_Bayes_classifier, printed on Jun. 1, 2010, in 7 pages.

Jander, "Launching Storage-Area Net," Data Communications, US, McGraw Hill, NY, vol. 27, No. 4(Mar. 21, 1998), pp. 64-72.

Karl Langdon et al., "Data Classification: Getting Started," Storage Magazine, Jul. 2005, retrieved from http://storagemagazine.techtarget.com/magPrintFriendly/0,293813,sid35_gci1104445,00. html; on Aug. 25, 2005, 3 pages.

Microsoft, "GetFileAttributes," updated Sep. 2005, retrieved from http://msdn.microsoft.com/library/en-us/fileio/fs/getfileattributes.asp?frame=true on Nov. 10, 2005, 3 pages.

(56) References Cited

OTHER PUBLICATIONS

Microsoft, "GetFileAttributesEx," updated Sep. 2005, retrieved from http://msdn.microsoft.com/library/en-us/fileio/fs/getfileattributesex.asp?frame=true on Nov. 10, 2005, 2 pages.
Microsoft, "WIN32_File_Attribute_Data," updated Sep. 2005, retrieved from http://msdn.microsoft.com/library/en-us/fileio/fs/win32_file_attribute_data_str.asp?frame on Nov. 10, 2005, 3 pages.
O'Neill, "New Tools to Classify Data," Storage Magazine, Aug. 2005, retrieved from http://storagemagazine.techtarget.com/magPrintFriendly/0,293813,sid35_gci1114703,00.html on Aug. 25, 2005, 4 pages.
Richter et al., "A File System for the 21st Century: Previewing the Windows NT 5.0 Files System," Nov. 1998, retrieved from http://www.microsoft.com/msj/1198/ntfs/ntfs.aspx on Nov. 10, 2005, 17 pages.
Rosenblum et al., "The Design and Implementation of a Log-Structure File System," Operating Systems Review SIGOPS, vol. 25, No. 5, New York, US, pp. 1-15 (May 1991).
Szor, The Art of Virus Research and Defense, Symantec Press (2005) ISBN 0-321-30454-3, Part 1.
Szor, The Art of Virus Research and Defense, Symantec Press (2005) ISBN 0-321-30454-3, Part 2.
Witten et al., Data Mining: Practical Machine Learning Tools and Techniques, Ian H. Witten & Eibe Frank, Elsevier (2005) ISBN 0-12-088407-0, Part 1.
Witten et al., Data Mining: Practical Machine Learning Tools and Techniques, Ian H. Witten & Eibe Frank, Elsevier (2005) ISBN 0-12-088407-0, Part 2.
Search Report for European Application No. 06 844 595.6, dated Sep. 26, 2008, 5 pages.
International Search Report and Written Opinion dated Nov. 13, 2009, PCT/US2007/081681.
Partial International Search Results, PCT/US2006/045556, dated May 25, 2007, 2 pages.
International Search Report dated May 15, 2007, PCT/US2006/048273.
European Examination Report; Application No. 06848901.2, dated Apr. 1, 2009, pp. 7.
Excerpts from Dictionary of Computing & Communications, 2003, 6 pages.
Excerpts fron Microsoft Computer Dictionary, Microsoft Press, 5th ed., 2005. 7 pages.
Excerpts from W. Curtis Preston, Unix Backup & Recovery, 1st Edition, 1999, 21 pages.
Notice of Filing Date Accorded to Petition And Time For Filing Patent Owner Preliminary Response to *Cohesity, Inc.*, Petitioner, v. *Commvault Systems, Inc.*, Patent Oener, Case IPR2021-00934, U.S. Pat. No. 7,725,671, dated May 28, 2021 in 5 pages.
U.S. Pat. No. 7,725,671 in 316 pages (Part 1).
U.S. Pat. No. 7,725,671 in 234 pages (Part 2).
U.S. Pat. No. 7,725,671 in 290 pages (Part 3).
U.S. Pat. No. 7,725,671 in 291 pages (Part 4).
Declaration of Dr. Erez Zadok in the matter of Inter Partes Review of U.S. Pat. No. 7,725,671, *Cohesity Inc.*, Petitioner v. *Commvault Systems, Inc.*, Patent Owner, Case No.—IPR2021-00934, dated May 13, 2021 in 94 pages.
Tretau et al., "IBM Tivoli Storage Management Concepts", Redbooks Jul. 2003 in 486 pages.
Resume of Erez Zadok, written on May 7, 2021 in 64 pages.
Scheduling Order, *Commvault Systems, Inc.*, Plaintiff v. *Cohesity Inc.*, Defendant, Case 1:20-cv-00525-MN, filed Feb. 17, 2021 in 15 pages.
Affidavit of Duncan Hall, Exhibit A and Exhibit B in regarding of Internet Archive on Apr. 28, 2021 in 505 pages.
WebVoyage Record View 1 regarding Search Result for Search Request "IBM Tivoli Storahe Management Concept", Copyright Officem printed on Apr. 21, 2021 in 2 pages.
WorldCat Tivoli Index regarding Title: IBM Tivoli Storage Management Concept, printed on May 7, 2021 in 2 pages.
Declaration of Maria P. Garcia Under 37 C.F.R. § 1.68, *Cohesity, Inc.*, Petetioner v. *Commvault Systems, Inc.*, Patent Owner, U.S. Pat. No. 7,725,671, Case No. IPR2021-00394, filed on May 11, 2021 in 16 pages.
Declaration of Carol Edwards on behalf of IBM regarding document title: "IBM Tivoli Storage Management Concepts", filed on May 10, 2021 in 489 pages.
Microsoft Computer Dictionary, Fifth Edition, 2002, in 22 pages.
Sandberg, et al., "Design and Implementation or the SUD Network File:ystem", Sun Microsystems, Inc. 1985 in 12 pages.
Patterson et al., "SnapMirror®: File System Based Asynchronous Mirroring for Disaster Recovery", USENIX Association, 2002, in 13 pages.
Kim, et al., "The Design and Implementation of Tripwire: A File System Integrity Checker", COAST Laboratory, 1994, in 12 pages.
U.S. Pat. No. 7,725,671 in 316 pages (Part 1).Legato NetWorker, Administrator's Guide, Release 6.1, UNIX Version, 2001 in 638 pages.
Petition for Inter Partes Review of U.S. Pat. No. 7,725,671, *Cohesity Inc.*, Petitioner v. *Commvault Systems, Inc.*, Patent Owner , Case No. IPR2021-00934, dated May 14, 2021 in 74 pages.
Declaration of Sandeep Chatterjee, Ph.D. in support of Petition for Inter Partes Review of U.S. Pat. No. 7,725,671 B2, *Rubrik, Inc.*, Petitioner v. *Commvault Systems, Inc.*, Patent Owner, Case No. IPR2021-00589, dated Feb. 25, 2021, in 125 pages.
Declaration of Professor Mark T. Jones, Ph.D. in support of Petition for Inter Partes Review of U.S. Pat. No. 7,725,671 B2, *Rubrik, Inc.*, Petitioner v. *Commvault Systems, Inc.*, Patent Owner, Case No. IPR2021-00589, dated Jun. 9, 2021, in 59 pages.
Complaint for Patent Infringement, *Commvault Systems, Inc.*, Plaintiff, v. *Rubrick Inc.*, Defendant, Case No. 1:20-cv-00524-MN, U.S. District Court, District of Deleawre, filed on Apr. 21, 2020 in 29 pages.
Complaint for Patent Infringement, *Commvault Systems, Inc.*, Plaintiff, v. *Cohesity Inc.*, Defendant, Case No. 1:20-cv-00525-MN, U.S. District Court, District of Deleawre, filed on Apr. 21, 2020 in 28 pages.
Hitachi, "Storage Controller", https://web.archive.org/20201026005833/https://www.hitachi.com/rd/glossary/s/storage_controller.html, printed on Jun. 8, 2021 in 1 page.
Microsoft Computer Dictonary, Microsoft Press, 5th edition, 2002 in 5 pages.
Patent Owner Preliminary Response, *Rubrick, Inc.*, Petitioner v. *Commvault Systems, Inc.*, Patent Owner., U.S. Pat. No. 7,725,671, Case IPR2021-00589, dated Jun. 9, 2021 in 66 pages.
Petition for Inter Partes Review of U.S. Pat. No. 7,725,671 B2, *Rubrick, Inc.*, Petitioner v. *Commvault Systems, Inc.*, Patent Owner, Case No. IPR2021-00589, dated Feb. 26, 2021 in 79 pages.
PTAB-IPR2021-00589—Exhibit 2009—589 Declaration, Jul. 7, 2021, in 8 pages.
PTAB-IPR2021-00589—Exhibit 2010—674 Disclaimer, Jul. 8, 2021, in 6 pages.
PTAB-IPR2021-00589—Exhibit 3001, Aug. 30, 2021, in 2 pages.
PTAB-IPR2021-00589—Joint Motion to Terminate, Aug. 31, 2021, in 7 pages.
PTAB-IPR2021-00589—Joint Request to Seal Settlement Agreement, Aug. 31, 2021, in 4 pages.
PTAB-IPR2021-00589—Termination Order, Sep. 1, 2021, in 4 pages.
PTAB-IPR2021-00934—Exhibit 2001—934 Declaration, Jul. 7, 2021, in 8 pages.
PTAB-IPR2021-00934—Exhibit 2002—Jones Declaration, Aug. 30, 2021, in 55 pages.
PTAB-IPR2021-00934—Exhibit 2003—Joint Claim Construction Chart, in 32 pages.
PTAB-IPR2021-00934—Exhibit 2004—Stack, Sep. 2016, in 41 pages.
PTAB-IPR2021-00934—Exhibit 2005—IEEE 100, Dec. 2000, in 3 pages.
PTAB-IPR2021-00934—Exhibit 2006—Microsoft Computer Dictionary, 2002, in 3 pages.
PTAB-IPR2021-00934—Exhibit 2007—Dictionary of Computer and Internet Terms, 2013, in 3 pages.

(56) References Cited

OTHER PUBLICATIONS

PTAB-IPR2021-00934—Exhibit 2008—McGraw-Hill Dictionary of Scientific and Technical Terms, 2003, in 3 pages.
PTAB-IPR2021-00934—POPR, Aug. 30, 2021, in 60 pages.

* cited by examiner

SYSTEMS AND METHODS FOR PROBABILISTIC DATA CLASSIFICATION

RELATED APPLICATION

This application is a continuation of U.S. patent application Ser. No. 16/818,781, entitled "SYSTEMS AND METHODS FOR PROBABILISTIC DATA CLASSIFICATION" and filed on Mar. 13, 2020, which is a continuation of U.S. patent application Ser. No. 15/654,042, entitled "SYSTEMS AND METHODS FOR PROBABILISTIC DATA CLASSIFICATION" and filed on Jul. 19, 2017, issued as U.S. Pat. No. 10,628,459, which is a continuation of U.S. patent application Ser. No. 14/968,719, entitled "SYSTEMS AND METHODS FOR PROBABILISTIC DATA CLASSIFICATION" and filed on Dec. 14, 2015, issued as U.S. Pat. No. 9,740,764, which is a continuation of U.S. patent application Ser. No. 13/615,084, entitled "SYSTEMS AND METHODS FOR PROBABILISTIC DATA CLASSIFICATION" and filed on Sep. 13, 2012, which is a continuation of U.S. patent application Ser. No. 12/022,676, entitled "SYSTEMS AND METHODS FOR PROBABILISTIC DATA CLASSIFICATION" and filed on Jan. 30, 2008, each of which is incorporated by reference herein in its entirety. Any and all applications for which a foreign or domestic priority claim is identified in the Application Data Sheet as filed with the present application are hereby incorporated by reference under 37 CFR 1.57.

BACKGROUND OF THE INVENTION

Field of the Invention

The field of the invention relates to systems and methods for performing data classification operations.

Description of the Related Art

As modern enterprise environments trend towards a paperless workplace, electronic data is often created at a high rate. This electronic data takes a variety of forms which may include emails, documents, spreadsheets, images, databases, etc. Businesses have a need to fyu48y effectively classify and organize all of this electronic data.

However, it can be extremely difficult to accurately classify large amounts of data in ways which are time and cost effective. Existing solutions have typically allowed a user to classify files in at least one of two ways. The user can manually view each file and determine the appropriate classification. While this can be a relatively accurate method of categorizing data, it quickly becomes expensive and impractical as the volume of data-to-be-classified increases.

Alternatively, files can be classified using an explicit set of rules defined by the user. For example, a data classification rule may be based on inclusion of a keyword or a small set of keywords. With this approach, the classification of files can be done by machine, but the use of explicit rules tends to be a relatively inaccurate method of classifying non-homogeneous files and can result in many false classifications.

SUMMARY OF THE INVENTION

Therefore, there is a need for more accurate automated systems for classifying and organizing the large amounts of computer data which exist in modern enterprise environments.

One embodiment of the invention comprises a file system configured to store a plurality of computer files; a scanning agent configured to traverse the file system and compile data regarding the attributes and content of the plurality of computer files; an index configured to store the data regarding attributes and content of the plurality of computer files; and a file classifier configured to analyze the data regarding the attributes and content of the plurality of computer files and to classify the plurality of computer files into one or more categories based on the data regarding the attributes and content of the plurality of computer files.

Another embodiment of the invention comprises a method of traversing a file system and compiling data regarding attributes and content of a plurality of computer files stored in the file system; storing the data regarding attributes and content of the plurality of computer files in an index; analyzing the data regarding the attributes and content of the plurality of computer files; and classifying the plurality of computer files into one or more categories based on the data regarding the attributes and content of the plurality of computer files.

Another embodiment of the invention comprises means for traversing a file system and compiling data regarding attributes and content of a plurality of computer files stored in the file system; means for storing the data regarding attributes and content of the plurality of computer files in an index; means for analyzing the data regarding the attributes and content of the plurality of computer files; and means for classifying the plurality of computer files into one or more categories based on the data regarding the attributes and content of the plurality of computer files.

DETAILED DESCRIPTION OF THE PREFERRED EMBODIMENT

Figure 1:
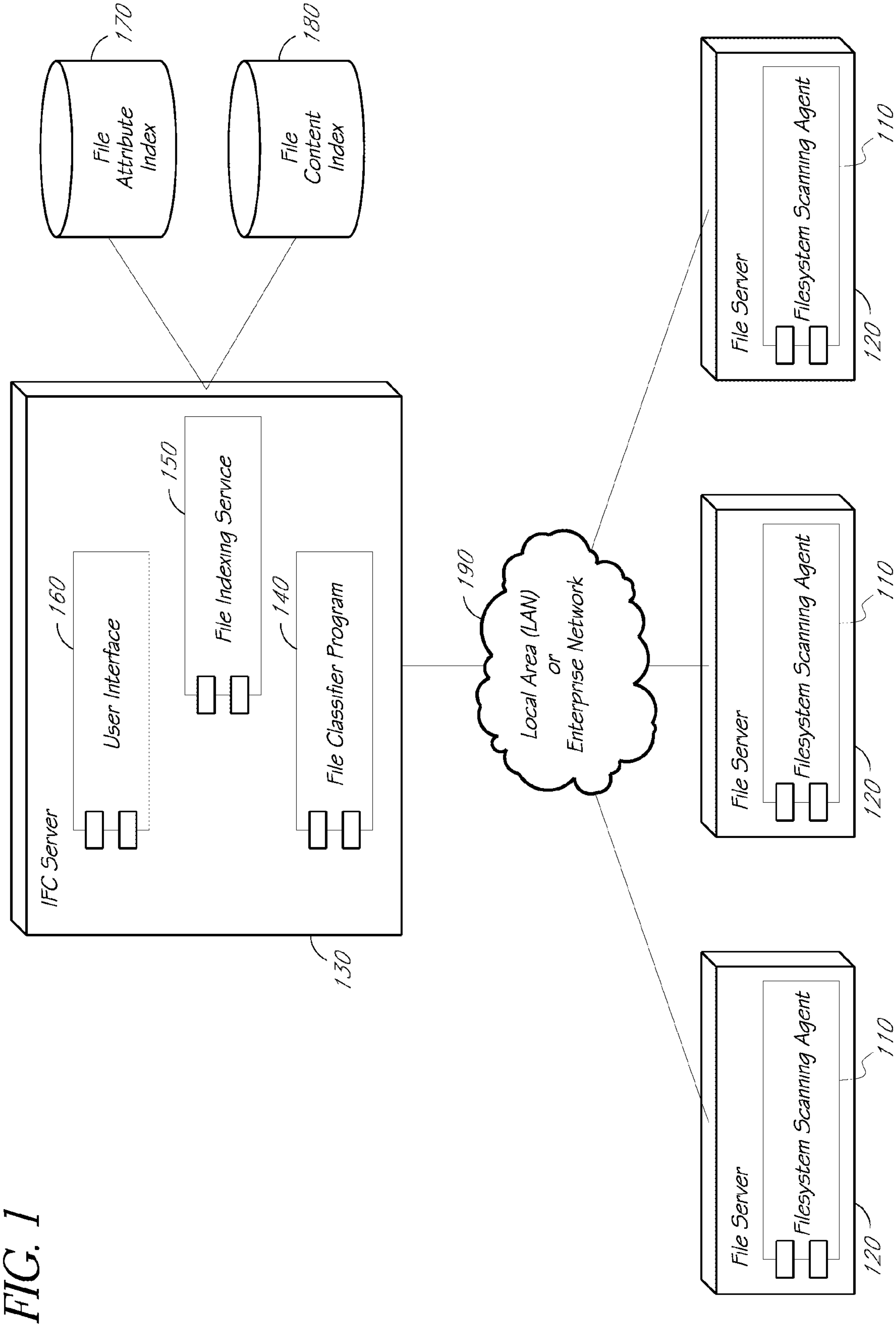
FIG. 1 is a schematic representation of a data classification system.

As discussed previously, there can be tradeoffs involved in performing electronic data classification. Electronic data classification can be performed manually with relatively good accuracy, but the process is slow and expensive. This type of process can be referred to as supervised classification. In other cases, data classification can be performed in an automated manner, but if done using explicit rules only, automated classification can result in relatively poor accuracy. This can be referred to as unsupervised classification. In still other cases, techniques can be used which result in semi-supervised classification.

Semi-supervised classification techniques may rely on some degree of human input to train a machine to recognize various categories of data. Once the machine has been trained, it can perform data classification operations independent of further human intervention. Semi-automated techniques of this sort can result in greater accuracy than more simplistic automated methods which rely solely on explicit rules. One example of a semi-supervised data classification technique of this sort is a Naïve Bayes classifier. Naïve Bayes classifiers have found use in certain email systems to help in rejecting unwanted, or "spam," messages as they arrive over a network at an email server, for example, but not to existing files stored in a computer system.

Apart from the filtering of incoming email messages, significant benefits can be had from applying the Naïve Bayes method, as well as other classification methods, to data that is already stored in a computer system. In particular, there are tremendous advantages to be had from applying data classification methods to large-scale computing systems with tremendous amounts of stored data. These advantages include, among others, using automated data classification methods classification to place proper security restrictions on access to certain files (this may be required by law in certain instances, such as in the case of medical records or private personnel information) or to control the location where a file is stored or backed up so that it can be located at a later date. Classification of data can also be useful in determining whether certain files should be deleted entirely, backed up in relatively fast access storage media, or permanently archived in slower access media.

Therefore, it would be advantageous to have an automated system, with improved accuracy, for carrying out file classification operations on the data stored in a business' computing system. In certain preferred embodiments of the invention, such an automated system would perform data classification on a substantial portion of a business' stored files on an enterprise-wide, cross-platform scope.

Just as there are many reasons to classify files, there are also many schemes of doing so. Generally speaking, the task of data classification is to assign electronic data to one or more categories based on content or characteristics of the data. In some cases, files may be grouped according to common characteristics such as file size or file extension. In other cases, files could be grouped with more sophisticated techniques according to subject matter. Many other classification schemes also exist and it should be understood that embodiments of the invention can be adapted to use a wide variety of classification schemes.

FIG. 1 is a schematic representation of an automated system for performing data classification on electronic files according to one embodiment of the invention. The file servers 120, which can include or be coupled to electronic data storage devices, handle I/O requests to a file system shared by a plurality of client computers (not shown) in a business' computing system. The client computers can be coupled to the file servers 120 via the Local Area Network (LAN) 190, or in any other way known in the art. In this way, the file servers 120 house a substantial portion of a business' electronic data, which is accessible to a plurality of client computers via the network 190.

In other embodiments, the shared data storage capacity could take a form other than shared file servers. For example, shared storage devices could be coupled to a plurality of client computers via a Storage Area Network (SAN) or a Network Attached Storage (NAS) unit. Other shared electronic data storage configurations are also possible.

In one embodiment, each file server 120 may include a file system scanning agent 110. The file system scanning agents 110 can systematically traverse data housed by a corresponding file server 120. The file system scanning agents 110 can access electronic files and compile information about the characteristics of the files, the content of the files, or any other attribute of interest that could serve as the basis for categorizing the electronic files. File system classification agents 110 can be configured to operate with any type of filesystem.

Furthermore, while the file system scanning agents 110 are illustrated as modules operating within the file servers 120, in other embodiments the file system scanning agents 110 can be separate devices coupled to file servers 120 via a network 190. In still other embodiments, file system scanning agents 110 can be made capable of directly accessing data storage devices shared by a plurality of client computers over the network 190, such as via SAN networks or NAS units. The file system scanning agents can be implemented in any combination of hardware and software.

As file system scanning agents 110 compile information about file characteristics, content, etc., the information can be shared with a file indexing service 150 which can maintain databases, such as a file attribute index 170 and a file content index 180, to store the information. In some embodiments, the file attribute index 170 can be combined with the file content index 180, or the two indexes can be implemented as a number of sub-indexes. In one embodiment, the file indexing service 150 may be a module operating on an Intelligent File Classifier (IFC) server 130 and information can be exchanged between the file system scanning agents 110 and the file indexing service 150 via the network 190.

The IFC server 130 can include a data processor and electronic memory modules. The IFC server may also include a file classifier program 140 module which can access the file attribute 170 and the file content 180 indexes and classify electronic data files as members of various categories, according to the methods described below. The IFC server 130 may also include a user interface 160 to allow a user to input the characteristics or content of a category of interest and to view a listing of the designated member files of a data classification operation performed by the file classifier program 140. The user interface 160 may comprise any type of user interface known in the art, such as an I/O terminal coupled to the IFC server 130 or a web server to allow a user to remotely access the IFC server 130.

Figure 2:
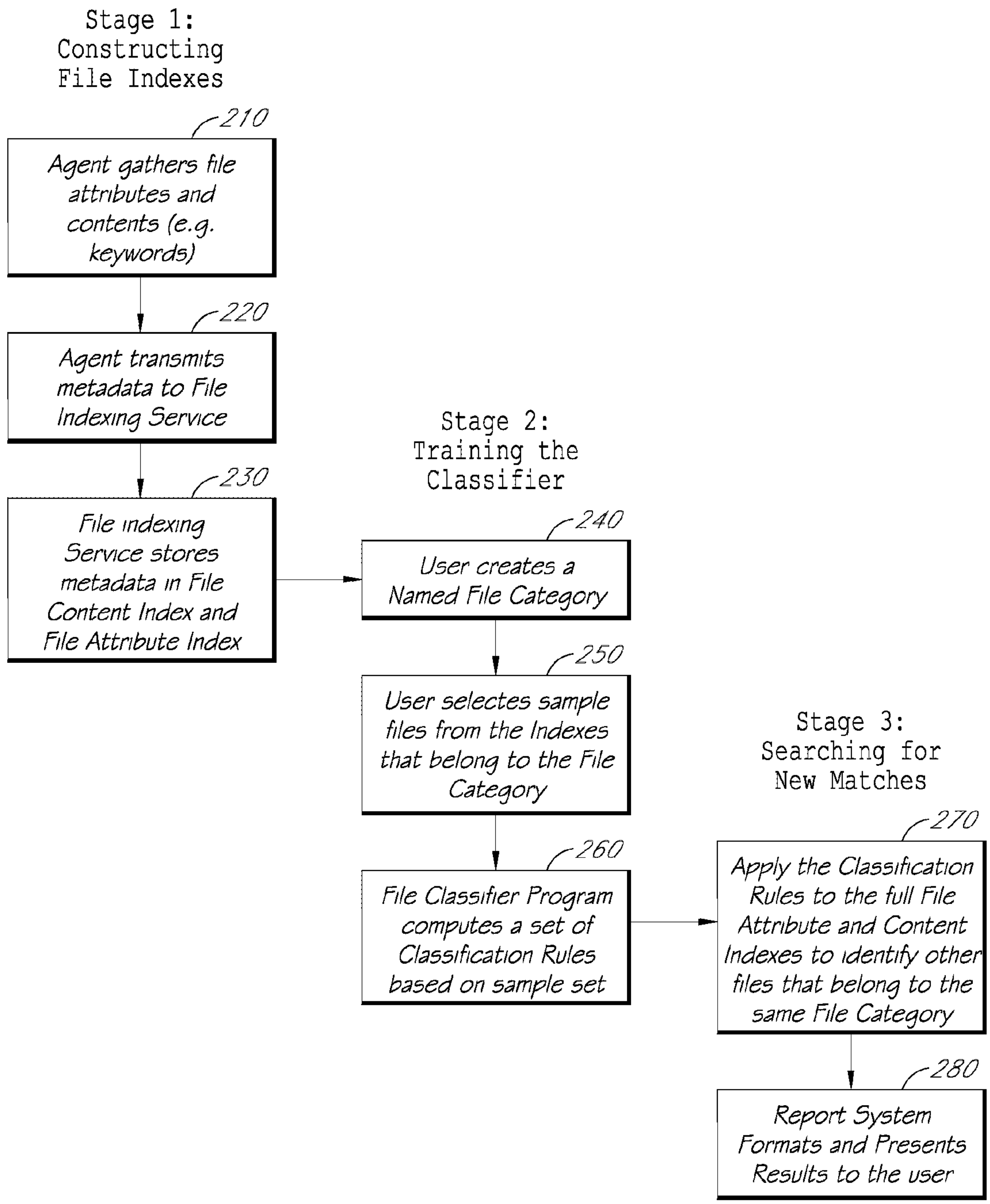
FIG. 2 is a flowchart for performing classification operations on data files.

FIG. 2 is a flowchart which represents an exemplary method of performing data classification operations using the system illustrated in FIG. 1. At block 210 a file system scanning agent 110 traverses a file system and compiles information regarding the attributes and content of electronic files stored in the filesystem. In some embodiments, the file system scanning agents 110 may have access to a database which indicates the date that a particular file's attributes and content were last gathered. In these embodiments, the file system scanning agents 110 may determine whether this date came after the last known modification to the file, in which case the file system scanning agent 110 may be configured to skip the current file and move on to the next available file.

In other embodiments, the file system scanning agents 110 may be notified any time a file is created or modified so that the new or modified file's attributes and contents can be compiled or updated. The file system scanning agents 110 may be notified of these events by file system drivers whenever a file system I/O request is made, by a packet sniffer coupled to a network which scans the contents of data packets transmitted over the network to determine when a file is created or modified, or using any other technique known in the art.

File attributes compiled by the file system scanning agents 110 may include, but are not limited to, the file name, its full directory path, size, type, dates of last modification and access, or other types of metadata. The file attribute information may be transmitted to a file indexing service 150 to be stored in a file attribute index 170. This index may take the form of a relational database which can be searched by any attribute entry or combination of attributes. In certain embodiments, the file attribute index 170 can be a centralized database managed by a file indexing service 150 which receives file attribute and content information from a plurality sources. The file attribute index 170 may also include information regarding the categories to which a particular file is presently marked as belonging to, or has been marked as having belonged to in the past.

The file system scanning agents 110 can also analyze data files to catalog their content. For example, if the file includes text, the file system scanning agents 110 may create a list of keywords found within the file as well as frequency counts for each of the keywords. If the file is not a text file but rather an image of a document, the classification element 312 may first perform an optical character recognition (OCR) operation before creating keyword lists and frequency counts. The file content information may be transmitted to a file indexing service 150 to be stored in a file content index 180. The file content index 180 may take the form of a searchable database which contains the keyword lists and frequency counts gathered by the file system scanning agents 110 as well as logical mappings of keywords to the files in which they are found. Much like the file attribute index 170, it may be advantageous for the file content index to be managed by a file indexing service 150 which receives file attribute and content information from a plurality of sources.

The file content index 180 may be searched by file, producing a list of keywords for the file. The file content index 180 may also be searched by keyword, producing a list of files which contain that word. This type of search result can include a relevance ranking which orders the list of files which contain the search term by the frequency with which they appear in the file. Other methods of cataloguing and searching the file content index 180 can also be used.

Other types of files besides text-containing documents can be analyzed for content as well. For example, digital image processing techniques can be used to scan image files for certain image features using object recognition algorithms to create a catalogue of features that are identified. Similarly, audio files could be scanned to catalogue recognizable features. In fact, the file system scanning agents 110 can be used to analyze any file type for any type of content to the extent that there exists a method for performing such analysis. In any case, a catalogue of the identified file content can be kept in the file content index 180.

At block 220, a file system scanning agent 110 transmits file attribute and content information to the file indexing service 150. At block 230, the file indexing service 150 stores that information in the appropriate index. Files stored by the file servers 120 can classified, or designated as members of a defined category, based on the information in these indexes. The classification of a file can be based on information from the file attribute index 170, the file content index 180, or some combination of both.

As described above, some classification techniques are semi-supervised in that they rely on some degree of human input to train a machine to recognize various categories of data before. Once the machine has been trained, it can perform data classification operations substantially independent of further human intervention. Blocks 240, 250, and 260 represent an embodiment of a method for training an automated data classification system which employs semi-supervised classification techniques. Embodiments of the invention will be described below primarily in terms of a Naïve Bayes classification algorithm, however neural networks or strict Bayesian networks are also suitable candidates. Other types of classifiers or algorithms can also be used.

For example, it should be understood that fully supervised and fully unsupervised classification techniques can be advantageously used in certain embodiments of the invention. One embodiment of the invention may use a set of explicit user-defined rules to decrease the number of files to which a more computationally expensive classification method is then applied. For example, a user may wish to identify only recent files belonging to a particular category. In such a case, an explicit rule requiring a file to have been modified no longer than thirty days previously could be used to decrease the number of candidate files to be analyzed using a Naïve Bayes algorithm, which uses a more computationally complex calculation to determine a probability that a particular file belongs to the desired category.

At block 240, a user creates a name for a particular category of data, members of which he or she would like to locate amongst the mass of data stored in file servers 120 or some other type of shared storage device accessible to a plurality of client computers. This can be done with the user interface 160 of the IFC server. At block 250, the user can select sample files from the file attribute 170 and file content 180 indexes which are properly designated as members of the category of data which the user wishes to identify. These sample files can constitute a training set of data which allows the file classifier program 140 to "learn" how to identify files stored by the file servers 120 which are members of the desired category. Using this training set of data, the file classifier program 140 computes, at block 260, a set of classification rules that can be applied to the files from the file attribute 170 and file content 180 indexes which were not included in the training set.

At block 270, the set of test data is used to calculate a probability that a file belongs to the desired category. This can be done for each file indexed by the indexing service 150 that lies outside the training set selected by the user. Finally, at block 280, the user interface 160 can format the results of the classification operation and present the results to the user. For example, the user interface 160 can present a list of each file which was determined by the file classifier program 140 to belong to a desired category.

Some classification techniques, such as a Naïve Bayes algorithm, may output a probability that a given unclassified file should be marked as belonging to a certain category. In these embodiments, the determination that a file belongs to a particular category may be based on the calculated probability of the file belonging to the category exceeding a threshold. A determination can be made whether the probability is high enough to risk a mistaken classification and justify classifying the file as a member of the category in question. In such cases, the file classifier program 140 may be configured to mark the file as a member of the category if the probability exceeds a user-defined threshold.

For example, a user might configure the classification element to mark a file as a member of a category only if the calculated probability is greater than 85%. In cases where the accuracy of the classification operation IS critical and where the calculated probability falls short of the threshold by a relatively small margin, the file classifier program may be configured to mark the file as being a questionable member of the category and allow a user to view the file to determine whether it should or should not be designated as a member of the category in question.

Once the file has been classified, it may be labeled as a member of the designated category in the file attribute index.

A file may be classified as a member of more than one category. In some embodiments, a category of files may be defined temporarily by a user query. In other embodiments, a category of files can be defined on a relatively permanent basis and new files which meet the criteria of the category previously calculated by the file classifier program 140 on the basis of a training set of data can be automatically added to the category as they are created or modified.

A specific example of a Naïve Bayes classifier, according to one embodiment of the invention, will now be given based on the training data in the following chart.

| File Name | File Size <1 KB? | Contains Keyword "SSN"? | Belongs to "Personnel Records" Category? |
|---|---|---|---|
| Foo.doc | Yes | Yes | Yes |
| Bar.doc | No | Yes | Yes |
| Bas.doc | Yes | No | No |
| Qux.doc | Yes | No | No |
| Quux.doc | No | Yes | Yes |

In the above training set of data, five files have been marked by a user as belonging, or not belonging, to a category called "Personnel Records." The training data includes both members (Foo.doc, Bar.doc, and Quux.doc) of the desired category, as well as non-members (Bas.doc and Qux.doc). In this example, the data on whether each of the files in the training set is smaller than 1 KB can be obtained from the file attribute index 170. The data on whether each file contains the keyword "SSN" can be obtained from the file content index 180.

Based on this information, the file classifier program 140 can calculate a probability that files smaller than 1 KB are members of the "Personnel Records" category. Based on the above training data, one out of three files which are smaller than 1 KB are also members of the "Personnel Records" category, for a probability of 33%. The file classifier program 140 can also calculate a probability that files which contain the keyword "SSN" are members of the "Personnel Records" category. Three out of three files which contain the keyword "SSN" are also members of the "Personnel Records" category. This leads to a calculated probability of 100% that a file belongs to the "Personnel Records" category if it contains the keyword "SSN."

An overall probability that a file belongs to the desired category can also be calculated from the training set of data. In this case, three out of the five files in the training set are members of the "Personnel Records" category for an overall probability of membership of 60%. Using these probabilities, the file classifier program can analyze whether files outside the training set are smaller than 1 KB or contain the keyword "SSN," and then determine the probability that the file belongs to the "Personnel Records" category using Bayes Theorem, or similar method.

In general, the larger the training set of data and the more representative it is of a cross-section of files in the file system in terms of attributes, content, and membership in the desired category, the more accurate will be the results obtained from the classification operation performed by the file classifier program 140 when using a Naïve Bayes algorithm. However, other characteristics of a training set of data can be emphasized in embodiments of the invention which use other classification algorithms.

Once the file classifier program 140 has finished classifying a file, some course of action may be taken by the IFC server 130 based on the outcome of the file classification operation. In some cases the course of action may be pre-determined and user-defined. In this type of embodiment, IFC server 130 may include a database that contains a list of classification outcomes, such as "File Classified as Personnel Information," as well as a corresponding action to be performed when the associated classification outcome occurs. In other embodiments, the IFC server 130 may include learning algorithms to independently determine what course of action to take after a classification operation is completed based on its past experience or based on a set of training data that has been provided to guide its actions.

One action that could be taken by the IFC server 130 based on a file classification outcome is changing access permissions on a file based on the sensitivity of the category to which it belongs. It may be desirable to limit access of the file to certain users of the host computing system for any number of reasons: the file may contain sensitive personal employee information, trade secrets, confidential financial information, etc.

Another action that could be taken by the IFC server 130 based on a file classification outcome is to change the backup or archive schedule for the file. Certain categories of files may be classified as non-critical. It may be preferable to backup these types of files less regularly in order to conserve system resources. In addition, these files may be migrated to slower access storage sooner than would be the case for more important files, or possibly never. Other categories of files may be classified as critical data. As such, it will likely be desirable to regularly backup these files and possibly maintain them in fast access memory for an extended period of time.

In addition, it would be possible to carefully create and manage a schedule for permanently archiving these files due to the critical information they contain. In embodiments of the invention where the results of a data classification operation are used to influence how certain categories of information are backed up or archived, it may be beneficial to integrate a data classification system, such as the one illustrated in FIG. 1, with a data storage and backup system. Many different types of data storage and backup systems can be used for this purpose. However, an exemplary data storage and backup system which can be modified to include a data classification system is illustrated in FIG. 3.

Figure 3:
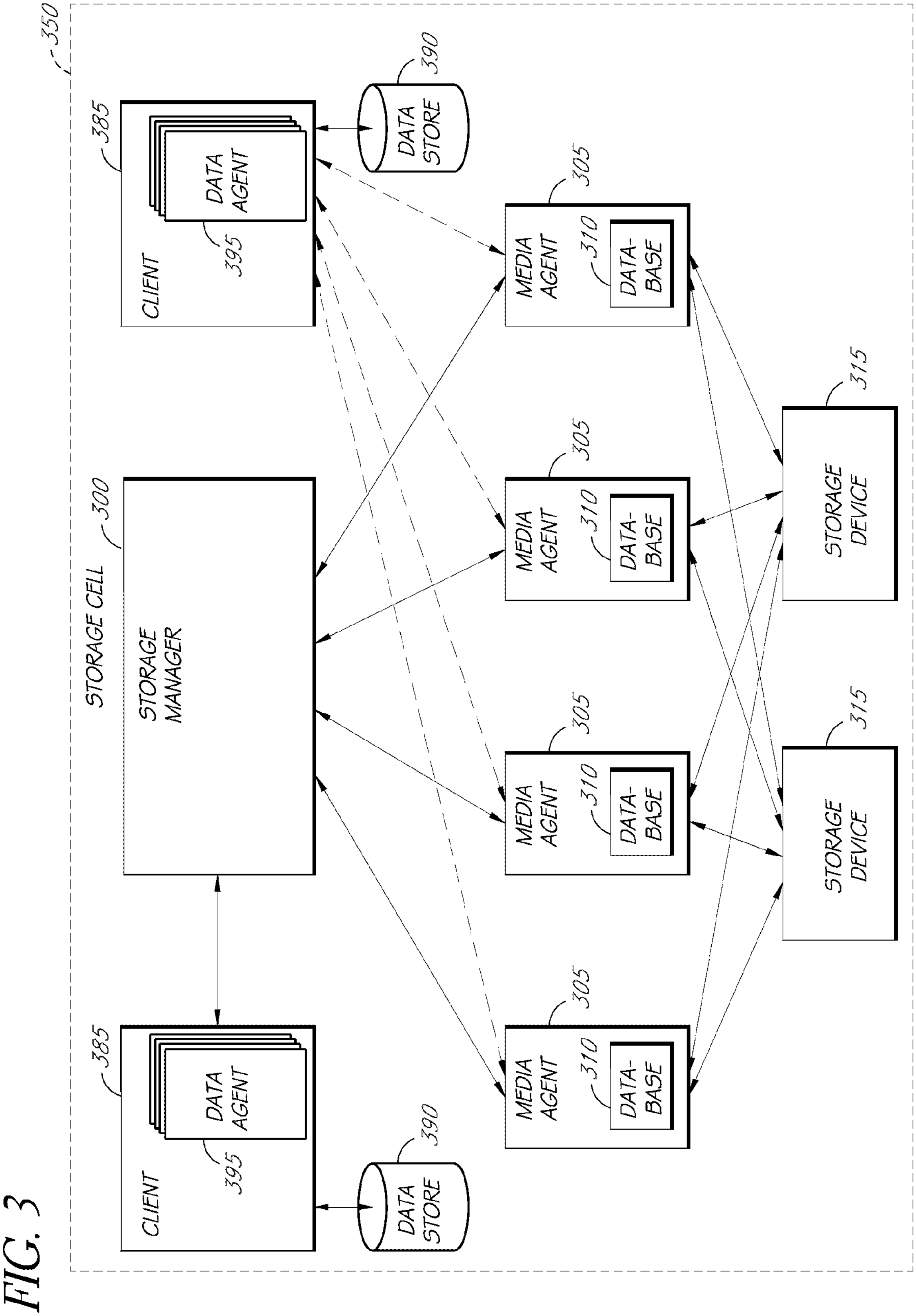
FIG. 3 is a schematic illustration of an embodiment of a data storage system for performing data storage operations for one or more client computers into which may be integrated a data classification system.

FIG. 3 illustrates a storage cell building block of a modular data storage and backup system. A storage cell 350 of a data storage system performs storage operations on electronic data for one or more client computers in a networked computing environment. The storage system may comprise a Storage Area Network (SAN), a Network Attached Storage (NAS) system, a combination of the two, or any other storage system at least partially attached to a host computing system and/or storage device by a network. Besides operations that are directly related to storing electronic data, the phrase "storage operation" is intended to also convey any other ancillary operation which may be advantageously performed on data that is stored for later access.

Storage cells of this type can be combined and programmed to function together in many different configurations to suit the particular data storage needs of a given set of users. Each storage cell 350 may participate in various storage-related functions, such as backup, data migration, quick data recovery, etc. In this way storage cells can be used as modular building blocks to create scalable data storage and backup systems which can grow or shrink in storage-related functionality and capacity as a business' needs dictate. This type of system is exemplary of the CommVault QiNetix system, and also the CommVault GAL- AXY backup system, available from CommVault Systems, Inc. of Oceanport, N.J. Similar systems are further described in U.S. patent application Ser. Nos. 09/610,738 AND 11/120,619, which are hereby incorporated by reference in their entirety.

As shown, the storage cell 350 may generally comprise a storage manager 300 to direct various aspects of data storage operations and to coordinate such operations with other storage cells. The storage cell 350 may also comprise a data agent 395 to control storage and backup operations for a client computer 385 and a media agent 305 to interface with a physical storage device 315. Each of these components may be implemented solely as computer hardware or as software operating on computer hardware.

Generally speaking, the storage manager 300 may be a software module or other application that coordinates and controls storage operations performed by the storage operation cell 350. The storage manager 300 may communicate with some or all elements of the storage operation cell 350 including client computers 385, data agents 395, media agents 305, and storage devices 315, to initiate and manage system backups, migrations, and data recovery. If the storage cell 350 is simply one cell out of a number of storage cells which have been combined to create a larger data storage and backup system, then the storage manager 300 may also communicate with other storage cells to coordinate data storage and backup operations in the system as a whole.

In one embodiment, the data agent 395 is a software module or part of a software module that is generally responsible for archiving, migrating, and recovering data from a client computer 385 stored in an information store 390 or other memory location. Each client computer 385 may have at least one data agent 395 and the system can support multiple client computers 385. In some embodiments, data agents 395 may be distributed between a client 385 and the storage manager 300 (and any other intermediate components (not shown)) or may be deployed from a remote location or its functions approximated by a remote process that performs some or all of the functions of data agent 395.

Embodiments of the storage cell 350 may employ multiple data agents 395 each of which may backup, migrate, and recover data associated with a different application. For example, different individual data agents 395 may be designed to handle Microsoft Exchange data, Lotus Notes data, Microsoft Windows file system data, Microsoft Active Directory Objects data, and other types of data known in the art. Other embodiments may employ one or more generic data agents 395 that can handle and process multiple data types rather than using the specialized data agents described above.

Generally speaking, a media agent 305 may be implemented as software module that conveys data, as directed by a storage manager 300, between a client computer 385 and one or more storage devices 315 such as a tape library, a magnetic media storage device, an optical media storage device, or any other suitable storage device. The media agent 305 controls the actual physical level data storage or retrieval to and from a storage device 315. Media agents 305 may communicate with a storage device 315 via a suitable communications path such as a SCSI or fiber channel communications link. In some embodiments, the storage device 315 may be communicatively coupled to a media agent 305 via a SAN or NAS system, or a combination of the two. As shown in FIG. 3, media agents 305 may include databases 310.

It should be appreciated that any given storage cell in a modular data storage and backup system, such as the one described, may comprise different combinations of hardware and software components besides the particular configuration illustrated in FIG. 3. Furthermore, in some embodiments, certain components may reside and execute on the same computer. A storage cell may also be adapted to include extra hardware and software for performing additional tasks in the context of a data storage and backup system. In particular, storage operation cells may include hardware and software for performing file classification operations. In particular, the storage cell 350 may be modified to include a file system scanning agent 110 and an IFC server 130.

The IFC server 130 may comprise a file classifier program 140, a file indexing service 150, and a user interface 160. Each of these components may function substantially in accordance with the description of these components set forth above with reference to FIGS. 1 and 2. However, certain modification to these components may be dictated by the configuration of the computing system into which they are being incorporated. In these instances it is within the ability of one of ordinary skill in the art to make these adaptations.

Preferred embodiments of the claimed inventions have been described in connection with the accompanying drawings. While only a few preferred embodiments have been explicitly described, other embodiments will become apparent to those of ordinary skill in the art of the claimed inventions based on this disclosure. Therefore, the scope of the disclosed inventions is intended to be defined by reference to the appended claims and not simply with regard to the explicitly described embodiments of the inventions.

What is claimed is:

1. A system comprising:

one or more computing devices comprising computer hardware with one or more processors configured to:
- access one or more data blocks of one or more electronic files;
- compile, based on the one or more data blocks of one or more electronic files, index data usable for classifying the one or more electronic files,
  - wherein the index data for an electronic file includes content of the electronic file and at least one file attribute associated with the electronic file, and
  - wherein the index data is stored in an index database;
- classify the one or more electronic files as a member of a first category based at least in part on some of the content of the one or more electronic files and at least one file attribute of the index data associated with the one or more electronic files;
- following an incremental or differential backup of the one or more electronic files, access one or more modified data blocks of the one or more electronic files, wherein the one or more modified data blocks are data blocks that have been modified since the classification of the one or more electronic files as a member of the first category;
- update the index data associated with the one or more electronic files with compiled index data associated with the one or more modified data blocks; and
- classify the one or more electronic files as a member of a second category based at least in part on some of the content of the one or more electronic files and at least one file attribute of the updated index data associated with the one or more electronic files.

2. The system of claim 1, wherein the one or more electronic files is stored as a plurality of data blocks in one or more secondary storage devices.

3. The system of claim 1, wherein the one or more processors are further configured to:

determine a probability that the one or more electronic files should be classified as a member of the first category; and determine that the probability satisfies a probability threshold for classifying the one or more electronic files as a member of the first category, wherein the probability threshold is specified by a classification rule associated with the first category.

4. The system of claim 3, wherein the classification rule was computed using a training data set.

5. The system of claim 1, wherein the index data is stored separately from storage devices where the one or more electronic files are stored.

6. The system of claim 1, wherein the classifying the one or more electronic files comprises assigning one or more labels to one or more electronic files.

7. The system of claim 1, wherein the one or more computing devices are further configured to restore the one or more electronic files for compiling index data.

8. The system of claim 1, wherein the at least one file attribute comprises information indicating file size, name, path, type, or date of creation or modification of the one or more electronic files.

9. The system of claim 1, wherein the index data further comprises data indicating at least one classification category that the one or more electronic files have been identified as being members of.

10. The system of claim 9, wherein the one or more computing devices are further configured to alter security access restrictions of the one or more electronic files based upon the at least one classification category.

11. The system of claim 9, wherein the one or more computing devices are further configured to alter a data backup schedule or a data migration plan of the one or more electronic files based upon the at least one classification category.

12. The system of claim 1, wherein the index data further comprises, for each electronic file, a list of keywords in the electronic file and a frequency count for each keyword.

13. The system of claim 1, wherein the one or more computing devices are further configured to use the index data to assign one or more labels to one or more electronic files based at least in part on one or more user-defined rules.

14. A non-transitory computer-readable storage medium storing instructions that when executed by a computer cause the computer to perform a method, the method comprising:

accessing one or more data blocks of one or more electronic files;

compiling, based on the one or more data blocks of the one or more electronic files, index data usable for classifying the one or more electronic files, wherein the index data for an electronic file includes content of the electronic file and at least one file attribute associated with the electronic file, and wherein the index data is stored in an index database;

classifying the one or more electronic files as members of a first category based at least in part on some of the content of the one or more electronic files and at least one file attribute of the index data associated with the one or more electronic files;

following an incremental or differential backup of the one or more electronic files, accessing one or more modified data blocks of the one or more electronic files, wherein the one or more modified data blocks are data blocks that have been modified since the classification of the one or more electronic files as a member of the first category;

updating the index data associated with the one or more electronic files with compiled index data associated with the one or more modified data blocks; and classifying the one or more electronic files as a member of a second category based at least in part on some of the content of the one or more electronic files and at least one file attribute of the updated index data associated with the one or more electronic files.

15. The non-transitory computer-readable storage medium of claim 14, wherein the method further comprises:

determining a probability that the one or more electronic files should be classified as a member of the first category; and determining that the probability satisfies a probability threshold for classifying the one or more electronic files as a member of the first category, wherein the probability threshold is specified by a classification rule associated with the first category.

16. The non-transitory computer-readable storage medium of claim 15, wherein the classification rule was computed using a training data set.

17. The non-transitory computer-readable storage medium of claim 14, wherein the index data is stored separately from storage devices where the one or more electronic files are stored.

18. The non-transitory computer-readable storage medium of claim 14, wherein the classifying the one or more electronic files comprises assigning one or more labels to one or more electronic files.

19. The non-transitory computer-readable storage medium of claim 14, the method further comprising restoring the one or more electronic files for compiling the index data.

20. The non-transitory computer-readable storage medium of claim 14, wherein the at least one file attribute comprises information indicating file size, name, path, type, or date of creation or modification of the one or more electronic files.

21. The non-transitory computer-readable storage medium of claim 14, wherein the index data further comprises data indicating at least one classification category that the one or more electronic files have been identified as being members of.

22. The non-transitory computer-readable storage medium of claim 21, the method further comprising altering security access restrictions of the one or more electronic files based on the classification of the one or more electronic files as a member of the first category.

23. The non-transitory computer-readable storage medium of claim 21, the method further comprising altering a data backup schedule or data migration plan of the one or more electronic files based upon the at least one classification category.

24. The non-transitory computer-readable storage medium of claim 14, wherein the index data further comprises, for each electronic file, a list of keywords in the electronic file and a frequency count for each keyword.

* * * * *